(12) United States Patent
Adkins et al.

(10) Patent No.: US 11,866,543 B2
(45) Date of Patent: Jan. 9, 2024

(54) GLYCIDYL (METH)ACRYLATE POLYMER POLYOL STABILIZERS

(71) Applicant: Covestro LLC, Pittsburgh, PA (US)

(72) Inventors: Rick L. Adkins, Canonsburg, PA (US); John E. Hayes, Gibsonia, PA (US)

(73) Assignee: Covestro LLC, Pittsburgh, PA (US)

( * ) Notice: Subject to any disclaimer, the term of this patent is extended or adjusted under 35 U.S.C. 154(b) by 309 days.

(21) Appl. No.: 17/313,122

(22) Filed: May 6, 2021

(65) Prior Publication Data

US 2022/0356296 A1    Nov. 10, 2022

(51) Int. Cl.
| | |
|---|---|
| C08G 18/83 | (2006.01) |
| C08F 283/06 | (2006.01) |
| C08F 285/00 | (2006.01) |
| C08G 18/08 | (2006.01) |
| C08G 18/63 | (2006.01) |
| C08G 18/81 | (2006.01) |
| C08J 9/02 | (2006.01) |
| C08G 101/00 | (2006.01) |

(52) U.S. Cl.
CPC .......... *C08G 18/833* (2013.01); *C08F 283/06* (2013.01); *C08F 285/00* (2013.01); *C08G 18/14* (2013.01); *C08G 18/632* (2013.01); *C08G 18/8108* (2013.01); *C08J 9/02* (2013.01); *C08G 2101/00* (2013.01); *C08J 2375/08* (2013.01)

(58) Field of Classification Search
CPC .. C08F 283/06; C08F 285/00; C08F 290/062; C08G 18/10; C08G 18/14; C08G 18/227; C08G 18/485; C08G 18/632; C08G 18/7671; C08G 18/8108; C08G 18/833; C08G 2101/00; C08J 9/02; C08J 2375/08
See application file for complete search history.

(56) References Cited

U.S. PATENT DOCUMENTS

| | | |
|---|---|---|
| 4,140,667 A | 2/1979 | Preston et al. |
| 4,186,271 A | 1/1980 | Preston et al. |
| 4,202,947 A | 5/1980 | Preston et al. |
| 4,242,249 A | 12/1980 | Van Cleve et al. |
| 4,394,491 A | 7/1983 | Hoffman |
| 4,477,603 A | 10/1984 | Fisk |
| 4,493,908 A | 1/1985 | Fisk |
| 4,500,675 A | 2/1985 | Fisk |
| 4,513,124 A | 4/1985 | Hoffman |
| 4,588,830 A | 5/1986 | Fisk et al. |
| 4,640,935 A | 2/1987 | Fisk et al. |
| 4,663,475 A | 5/1987 | Fisk |
| 4,680,358 A | 7/1987 | Yu |
| 4,723,026 A | 2/1988 | Cloetens et al. |
| 4,831,076 A | 5/1989 | Lidy et al. |
| 4,883,832 A | 11/1989 | Cloetens et al. |
| 5,109,075 A | 4/1992 | Yu |
| 5,196,476 A | 3/1993 | Simroth |
| 5,254,632 A | 10/1993 | Kerscher et al. |
| 5,814,699 A | 9/1998 | Kratz et al. |
| 5,854,386 A | 12/1998 | Shen et al. |
| 5,990,185 A | 11/1999 | Fogg |
| 6,013,731 A | 1/2000 | Holeschovsky et al. |
| 6,403,667 B1 | 6/2002 | Eleveld et al. |
| 7,160,975 B2 | 1/2007 | Adkins et al. |
| 7,759,423 B2 | 7/2010 | Chauk |
| 8,946,313 B2 | 2/2015 | Adkins et al. |
| 9,163,099 B2 | 10/2015 | Adkins et al. |
| 9,994,701 B2 | 6/2018 | Borella et al. |
| 10,479,862 B2 | 11/2019 | Adkins et al. |
| 10,526,484 B2 | 1/2020 | Adkins et al. |
| 10,767,008 B2 | 9/2020 | Adkins |
| 10,781,310 B2 | 9/2020 | Adkins |
| 10,851,239 B2 | 12/2020 | Adkins et al. |
| 2003/0220410 A1 | 11/2003 | Heinis et al. |
| 2013/0281627 A1* | 10/2013 | England ............ C08G 18/4841 526/227 |
| 2014/0275471 A1* | 9/2014 | Adkins ............... C08G 18/227 528/361 |
| 2021/0355263 A1 | 11/2021 | Li et al. |
| 2022/0017682 A1 | 1/2022 | Li et al. |

FOREIGN PATENT DOCUMENTS

| | | |
|---|---|---|
| EP | 0786480 B1 | 7/2003 |
| WO | 8703886 A1 | 7/1987 |
| WO | WO-2020132944 A1 * | 7/2020 ............ C08F 283/06 |

* cited by examiner

Primary Examiner — John M Cooney
(74) Attorney, Agent, or Firm — Donald R. Palladino

(57) ABSTRACT

This invention relates to novel macromers that comprise a polyether polyol having (meth)acrylate unsaturation. These novel macromers are the polymerization product of a glycidyl (meth)acrylate, with a polyether polyol, and optionally, an alkylene oxide, in the presence of a double metal cyanide catalyst. This invention also relates to preformed stabilizers prepared from these macromers, and to polymer polyols prepared from these novel macromers and novel preformed stabilizers. The present invention also relates to processes for preparing these compositions, to polyurethane foams comprising these polymer polyols, and to processes for preparing these polyurethane foams.

14 Claims, No Drawings

GLYCIDYL (METH)ACRYLATE POLYMER POLYOL STABILIZERS

FIELD

This invention relates to novel stabilizers for polymer polyols. These novel stabilizers include macromers and preformed stabilizers comprising these macromers. The invention also relates to polymer polyols comprising these macromers and preformed stabilizers, and to processes for the preparation of these compositions.

BACKGROUND

Polymer polyols, also known as filled polyols, are viscous fluids comprising fine particles dispersed in polyols. Examples of solids used include styrene-acrylonitrile copolymers and polyureas. The solids are typically prepared by in situ polymerization of ethylenically unsaturated monomers in the base polyol. Polymer polyols are commonly used for the production of polyurethane foams, and particularly flexible polyurethane foams.

Macromers are known and have been used to stabilize polymer polyols by co-polymerization with one or more ethylenically unsaturated monomers (such as, for example, styrene and acrylonitrile). Because of similarities in chemical composition, the polyether tail(s) energetically favor association with the polyol molecules in the continuous phase rather than with the styrene-acrylonitrile co-polymer. The polyether tails extend into the continuous phase, thereby forming a "brush" layer near the particle-fluid interface which screens the attractive Van der Waals forces between particles. This phenomenon is known as steric stabilization. In order to form a brush layer which effectively screens Van der Waals forces several conditions must be met. The polyether tails must be similar in chemical composition to the continuous phase so that they fully extend into the continuous phase and do not adsorb to the particles. Also, the surface coverage and molecular weight must be high enough so that the interfacial brush layer is sufficiently thick to prevent agglomeration of the solid particles.

It is known that large, bulky molecules are effective macromers because less material can be used to sterically stabilize the particles. Generally speaking, this is due to the fact that a highly branched polymer has a considerably larger excluded volume than a linear molecule (such as, e.g., a monol), and therefore less of the branched polymer is required. Coupling multi-functional polyols with polyisocyanates is also known and described in the field of polymer polyols as a suitable means to increase the molecular weight of the macromer.

Preformed stabilizers (PFS) are known to be useful for preparing polymer polyols having a lower viscosity at a high solids content. In general, a preformed stabilizer is an intermediate obtained by reacting a macromer which contains reactive unsaturation (e.g. acrylate, methacrylate, maleate, etc.) with a monomer (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <20%), or soluble grafts, etc.) Thus, in the preformed stabilizer process, a macromer is reacted with monomers to form a co-polymer composed of macromer and monomers. These co-polymers comprising a macromer and monomers are commonly referred to as preformed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

It has surprisingly been found that stable polymer polyols can be produced by using macromers produced via alkoxylation of glycidyl (meth)acrylates either singly or copolymerizing with additional alkylene oxides utilizing a double metal cyanide catalyst. The resulting polymer polyols have lower viscosity.

SUMMARY

This invention relates to a macromer comprising a polyether polyol having (meth)acrylate unsaturation which comprises the polymerization product of:
(a) a glycidyl (meth)acrylate,
with
(b) a polyether polyol having a hydroxyl number of 10 to 300, a functionality of 2 to 8, and an ethylene oxide content of 2 to 25% by weight, based on the total weight of the polyether polyol,
and, optionally,
(c) an alkylene oxide,
in the presence of
(d) a double metal cyanide catalyst.

The present invention also relates to a preformed stabilizer comprising the free-radical polymerization product of: (1) the novel macromer described above, with (2) an ethylenically unsaturated monomer; in the presence of: (3) a free-radical polymerization initiator; and, optionally, (4) a polymer control agent; and, optionally, (5) a liquid diluent.

This invention also relates to a polymer polyol comprising the free-radical, in-situ polymerization product of (A) a base polyol having a functionality of 2 to 5 and a hydroxyl number of 20 to 150, with (B) the novel preformed stabilizer described hereinabove, and (C) an ethylenically unsaturated monomer, in the presence of (D) a free-radical polymerization initiator, and, optionally, (E) a polymer control agent.

This invention also relates to a polymer polyol comprising the free-radical, in-situ polymerization product of: (A) a base polyol, with (B) the novel macromer described herein above, and (C) an ethylenically unsaturated monomer, in the presence of (D) a free-radical polymerization initiator, and, optionally, (E) a polymer control agent.

The invention also relates to a polyurethane foam that comprises the reaction product of a di- or polyisocyanate with an isocyanate-reactive component which comprises a polymer polyol as described herein, in the presence of a catalyst, a blowing agent and/or a surfactant.

The present invention also relates to a process for the preparation of the novel macromer. This process comprises: (1) polymerizing (a) a glycidyl (meth)acrylate, with (b) a polyether polyol having a hydroxyl number of 10 to 300, a functionality of 2 to 8, and an ethylene oxide content of 2 to 25% by weight, based on the total weight of the polyether polyol, and, optionally, (c) an alkylene oxide, in the presence of, (d) a double metal cyanide catalyst.

The invention also relates to a process of preparing a preformed stabilizer. This process comprises free-radically polymerizing (1) the novel macromer described above, with (2) an ethylenically unsaturated monomer; in the presence of: (3) a free-radical polymerization initiator; and, optionally, (4) a polymer control agent; and, optionally, (5) a liquid diluent.

This invention also relates to a process of preparing a polymer polyol. This process comprises free-radically polymerizing: (A) a base polyol having a hydroxyl number of 20 to 150 and a functionality of 2 to 5, with (B) the novel preformed stabilizer described herein, and (C) an ethylenically unsaturated monomer, in the presence of (D) a free-radical polymerization initiator, and, optionally, (E) a polymer control agent.

The invention also relates to a process of preparing a polymer polyol. This process comprises free-radically polymerizing: (A) a base polyol having a hydroxyl number of 20 to 150, and a functionality of 2 to 5, with (B) the novel macromer described herein, and (C) an ethylenically unsaturated monomer, in the presence of (D) a free-radical polymerization initiator, and, optionally, (E) a polymer control agent.

The invention also relates to a process of preparing a polyurethane foam in which the process comprises reacting a di- or poly-isocyanate component with an isocyanate-reactive component wherein the isocyanate-reactive component comprises the polymer polyol described herein, in the presence of a catalyst, a blowing agent and/or a surfactant.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the "nominal functionality" of a polyether polyol which is based solely on the functionality of the starter compound or initiator used to prepare the polyether polyol. The nominal functionality is typically used to describe the functionality of a specific compound.

Equivalent weights and molecular weights given herein in Daltons (Da) are number average equivalent weights and number average molecular weights respectively, as determined by GPC as described herein, unless indicated otherwise.

The number average and weight average, $M_n$ and $M_w$, respectively, molecular weights herein were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2× Mixed-D), refractive index (RI) detection and calibrated with polyethylene glycol as the standard.

Isocyanate index is the relative stoichiometric amount of isocyanate functional groups necessary to react with the isocyanate reactive groups present in the overall foam formulation. It is expressed as a percentage in this application; thus, equal stoichiometric amounts of isocyanate functional groups and isocyanate reactive functional groups in the formulation provides an isocyanate index of 100%.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation (>C=C<, i.e. two double bonded carbon atoms) that is capable of undergoing free radically induced addition polymerization reactions.

The term preformed stabilizer is defined as an intermediate obtained by reacting a macromer with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein, the phrase "mole unsaturation/mole polyol" is a calculated value which is determined by dividing the number of moles of unsaturated compound (e.g. TMI, maleic anhydride, etc.) used by the number of moles of polyol. The number of moles of polyol is calculated based on the molecular weight of the polyol as determined by the hydroxyl equivalent weight and nominal functionality.

As used herein, the phrase "polyol feed" refers to the amount of base polyol feed present in the polymer polyol or present in the process of preparing the polymer polyol.

As used herein, the phrase "total feed" refers to the sum of all quantities of components present in each of the various products (i.e., preformed stabilizers, polymer polyols, etc.) and/or present in the process of preparing each of the various products.

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene: acrylonitrile in the total polymer. One skilled in the art will recognize that this is an analytical confirmation of the main mechanism for controlling the S/AN ratio, which is the wt. % of monomers in the total reactor feed.

Hydroxyl numbers or OH numbers were determined according to ASTM D4274-11, and are reported in mg [KOH]/g [polyol].

As used herein "viscosity" is in millipascal-seconds (mPa.$) measured at 25° C. The viscosity was measured on an Anton Paar SVM3000 viscometer at 25° C. that has been demonstrated to give equivalent results as can be generated with ASTM-D4878-15. The instrument was calibrated using mineral oil reference standards of known viscosity.

The novel macromers comprise the reaction product of: (a) a glycidyl (meth)acrylate, with (b) a polyether polyol having a hydroxyl number of 10 to 300, a functionality of 2 to 8, and an ethylene oxide content of 2 to 25% by weight, based on the total weight of the polyether polyol, and, optionally (c) an alkylene oxide, in the presence of (d) a double metal cyanide catalyst.

Suitable glycidyl (meth)acrylates (a) comprise glycidyl acrylate and/or glycidyl methacrylate. In general, the amount of glycidyl (meth)acrylate present in the macromer is such that there are from 0.1 to 1.5 moles, or 0.2 to 1.3 moles of glycidyl (meth)acrylate per mole of (b) polyether polyol present in the macromer.

Also suitable are those molecules containing an alkylene oxide moiety derived from the reaction of glycidol and hydroxyl reactive compounds containing reactive unsaturation. Suitable examples of hydroxyl reactive compounds include compounds such as isopropenyl dimethyl benzyl isocyanate (TMI), 2-isocyanatoethyl methacrylate, maleic anhydride, adducts of isophorone diisocyanate and 2-hydroxyethyl methacrylate, adducts of toluenediisocyanate and 2-hydroxypropyl acrylate, etc.

Suitable polyether polyols (b) have a hydroxyl number of 10 to 300, a functionality of 2 to 8 and an ethylene oxide content of 2 to 25% by weight, based on the total weight of the polyether polyol. These polyether polyols may have a hydroxyl number of at least 10, or at least 15, or at least 20. The hydroxyl number of these starter compounds may be 300 or less, or 250 or less, or 200 or less. These starter compounds may have a hydroxyl number ranging between any combination of these upper and lower values, inclusive, such as, for example, at least 10 to 300, or at least 15 to 250, or at least 20 to 200.

The hydroxyl functionality of these starter compounds may be at least 2, or at least 2.5, or at least 3. The hydroxyl functionality of these starter compounds may also be 8 or less, or 7 or less, or 6 or less. In general, these starter compounds may have a hydroxyl functionality ranging between any combination of these upper and lower values, inclusive, such as, for example, at least 2 to 8, or at least 2.5 to 7, or at least 3 to 6.

Suitable compounds to be used as (b) the polyether polyols include polyoxyethylene glycols, triols, tetrols and higher functionality polyols, polyoxypropylene glycols, triols, tetrols and higher functionality polyols, polyoxyalkylene glycols, triols, tetrols and higher functionality polyols, mixtures thereof, etc. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. Preferred are those starters with a functionality greater than three. By alkoxylation of the starter, a suitable polyether polyol for component (b) of the macromer can be formed.

Suitable alkylene oxides (c) include ethylene oxide, propylene oxide, butylene oxide, styrene oxide, etc., and mixtures thereof. Preferred are ethylene oxide, propylene oxide and mixtures thereof.

Suitable catalysts (d) for the macromers herein include double metal cyanide catalysts. Examples of suitable double metal cyanide catalysts include those described in, for example, U.S. Pat. Nos. 3,427,256; 3,427,334; 3,427,335; 3,829,505; 4,472,560; 4,477,589; 5,158,922; 5,470,813, 5,482,908; 5,545,601 and 5,482,908, the disclosures of which are herein incorporated by reference.

The macromer typically comprises the reaction product of (a) the glycidyl (meth)acrylate, with (b) the polyether polyol, and optionally, (c) an alkylene oxide, in the presence of (d) a double metal cyanide catalyst, at temperatures of 25 to 250° C. for time periods of from 1 to 10 hours. It is preferred that this reaction is at temperatures of 60 to 200° C. for a time of from 2 to 7 hours.

The preformed stabilizers herein comprise the free-radical polymerization product of: (1) a macromer as described herein, with (2) an ethylenically unsaturated monomer, in the presence of (3) a free-radical polymerization initiator and, optionally, (4) a polymer control agent, and, optionally, (5) a liquid diluent.

Suitable (2) ethylenically unsaturated monomers for the preformed stabilizers of the invention include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N, N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the preformed stabilizer. Of the above monomers, the monovinylidene aromatic monomers, particularly styrene, and the ethylenically unsaturated nitriles, particularly acrylonitrile, are preferred.

When using a mixture of monomers, it is preferred to use a mixture of two monomers. These monomers are typically used in weight ratios of from 80:20 (styrene:acrylonitrile) to 20:80 (S:AN), or preferably from 75:25 (S:AN) to 25:75 (S:AN).

Suitable free-radical polymerization initiators (3) for preformed stabilizer are those initiators having a satisfactory half-life within the temperature ranges used in forming the stabilizer, i.e. the half-life should be 25% or less of the residence time in the reactor at any given time. Preferred initiators for this portion of the invention include acyl peroxides such as didecanoyl peroxide and dilauroyl peroxide, alkyl peroxides such as di-tert-butyl peroxide and dicumyl peroxide, peroxyketals such as 1,1-di(t-butylperoxy)cyclohexane, 1,1-di(t-amylperoxy)cyclohexane, peroxyesters such as t-butyl peroxy-2-ethylhexanoate (TBPEH), t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis(isobutyronitrile), 2,2'-azo bis-(2-methoxylbutyronitrile), and mixtures thereof. Most preferred are the peroxyketals and peroxyesters described above, and azo catalysts.

Suitable free-radical initiators are present in concentrations ranging from 0.01 to 2% by weight, or from 0.05 to 1% by weight, or preferably from 0.05 to 0.5% by weight, or between any combination of the preceding upper and lower limits, inclusive, based on the total weight of the components (i.e. 100% by weight of the combined weight of the macromer, the ethylenically unsaturated monomer, the free-radical polymerization initiator and, optionally the polymer control agent and/or the liquid diluent).

The preformed stabilizers may also comprise a polymer control agent (4). Suitable polymer control agents for this aspect of the present invention include, for example, isopropanol, ethanol, tert-butanol, toluene, ethylbenzene, triethylamine, dodecylmercaptan, octadecylmercaptan, carbon tetrachloride, carbon tetrabromide, chloroform, methylene chloride. Polymer control agents are also commonly referred to as molecular weight regulators. These compounds are employed in conventional amounts to control the molecular weight of the copolymerizate. Isopropanol is a preferred polymer control agent.

Suitable diluents (5) for the preformed stabilizers of the present invention include, for example, compounds such as, polyols, hydrocarbons, ethers etc., and mixtures thereof.

Suitable polyols to be used as a diluent (5) comprise, for example, poly(oxypropylene) glycols, triols and higher functionality polyols. Such polyols include poly(oxypropylene-oxyethylene) polyols; however, desirably the oxyethylene content should comprise less than 50% by weight of 100% by weight of oxyalkylene groups. The ethylene oxide can be incorporated in any fashion along the polymer chain. Stated another way, the ethylene oxide can be either incorporated in internal blocks, as terminal blocks, or may be randomly distributed along the polymer chain. It is well known in the art that polyols contain varying amounts of non-induced unsaturation. The extent of unsaturation does not affect in any adverse way the formation of the polymer polyols in accordance with the present invention.

The polyols employed as a diluent can have hydroxyl numbers which vary over a wide range. In general, the hydroxyl numbers of the polyols employed in the invention can range from 20 mg KOH/g polyol and higher, to 280 mg KOH/g polyol and lower. The hydroxyl number is reported in mg KOH/g polyol and defined as the number of milligrams of potassium hydroxide required for the complete hydrolysis of the fully phthalated derivative prepared from 1 gram of polyol. The hydroxyl number can also be defined by the equation:

$$OH=(56.1>1000\times f)/m.w.$$

where:
OH=hydroxyl number of the polyol;
f=functionality, that is, average number of hydroxyl groups per molecule of the polyol;
and
m.w.=molecular weight of the polyol.

The exact polyol employed depends upon the end use of the polyurethane product to be produced. The molecular weight of the hydroxyl number is selected properly to result in flexible or semi-flexible foams or elastomers when the polymer polyol produced from the polyol is converted to a polyurethane. The polyols preferably possess a hydroxyl number of from 50 mg KOH/g polyol to 150 mg KOH/g polyol for semi-flexible foams and from 30 mg KOH/g polyol to 70 mg KOH/g polyol for flexible foams. Such limits are not intended to be restrictive, but are merely illustrative of the large number of possible combinations of the above polyol co-reactants.

In general, the amount of the components in the formulation, on a weight percent of the total formulation for forming the preformed stabilizer (B) of the present invention is as follows:

(1) from 10 to 40 wt. %, or from 15 to 35 wt. % of a macromolecule, macromer or precursor stabilizer;

(2) from 10 to 30 wt. %, or from 15 to 25 wt. % of an ethylenically unsaturated monomer, (3) from 0.03 to 2 wt. % of a free radical polymerization initiator, (4) optionally, from 30 to 80 wt. %, or from 40 to 70 wt. % of a polymer control agent, and (5) optionally, from 0 to 40 wt. %, or from 0 to 10 wt. %, of a diluent.

In the above-given formulation, the wt. %'s of components (1), (2), (3), and optionally (4), and optionally (5), total 100% by weight of component (B), the preformed stabilizer.

Suitable processes for preparing the preformed stabilizers are similar to known methods described in, for example, U.S. Pat. Nos. 5,196,476, 5,268,418, and 7,759,423, the disclosures of which are herein incorporated by reference. In general, the process of preparing the preformed stabilizer is similar to the process of preparing the polymer polyol. The temperature range is not critical and may vary from 80 to 150° C. or higher, and preferably from 115 to 125° C. or so. The catalyst and temperature should be selected such that the catalyst has a reasonable rate of decomposition with respect to the hold-up time in the reactor for a continuous flow reactor or the feed time for a semi-batch reactor.

Mixing conditions employed in this process are obtained by using a back mixed reactor (e.g. a stirred flask or stirred autoclave). The reactors of this type keep the reaction mixture relatively homogeneous and prevent localized high monomer to macromer ratios such as occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The combination of conditions selected for the preparation of the preformed stabilizer should not lead to cross-linking or gel formation in the preformed stabilizer which can adversely affect the ultimate performance in preparing the polymer polyol composition. Combinations of too low a diluent concentration, too high a macromer and/or monomer concentration, too high a catalyst concentration, too long of a reaction time, and too much unsaturation in the macromer can result in ineffective preformed stabilizer from cross-linking or gelling.

Preferred processes of preparing the preformed stabilizers herein are those as described in, for example, U.S. Pat. Nos. 5,196,476 and 5,268,418, the disclosures of which are hereby incorporated by reference. Preferred diluents and relative concentrations, ethylenically unsaturated monomers and relative concentrations, free-radical initiators and relative concentrations, and process conditions set forth in the references U.S. Pat. Nos. 5,196,476, 5,268,418 and 7,759,423.

It is evident that the macromers of the present invention differ from the macromers described by these references, and thus result in structurally different preformed stabilizers.

The polymer polyols of the present invention comprise the free-radical, in-situ polymerization product of (A) a base polyol, (B) the novel macromers described herein, and (C) one or more ethylenically unsaturated monomers in the presence of (D) a free-radical initiator, and optionally, (E) a polymer control agent. The process for the preparation of polymer polyols comprises free-radically polymerizing (A) a base polyol, (B) the novel macromers described herein, and (C) one or more ethylenically unsaturated monomers, in the presence of (D) a free-radical initiator, and optionally (E) a polymer control agent, The resultant polymer polyols exhibit solids contents, i.e., from 20 to 70% by weight, based on 100% by weight of the resultant polymer polyol. The solids content of the polymer polyols may also range from 40 to 60% by weight, or from 40 to 55% by weight. These polymer polyols also exhibit good viscosities, i.e. from 2000 to 15,000 mPa·s, and good filterability. By good filterability, it is meant that 100% of polymer polyol passes through a 700-mesh screen in less than 600 seconds. A suitable method for determining filterability is described in the Examples.

The polymer polyols of the present invention comprise the free-radical, in-situ polymerization product of (A) a base polyol, (B) the preformed stabilizer described herein, and (C) one or more ethylenically unsaturated monomers in the presence of (D) at least one free-radical initiator, and optionally, (E) a polymer control agent. The process for the preparation of polymer polyols comprises free-radically polymerizing (A) a base polyol, (B) the preformed stabilizer described herein, and (C) one or more ethylenically unsaturated monomers, in the presence of (D) at least one free-radical initiator, and optionally (E) a polymer control agent. The resultant polymer polyols exhibit solids contents, i.e., from 20 to 70% by weight, based on 100% by weight of the resultant polymer polyol. The solids content of the polymer polyols may also range from 40 to 60% by weight, or from 40 to 55% by weight. These polymer polyols also exhibit good viscosities, i.e. from 2000 to 15,000 mPa·s, and good filterability. By good filterability, it is meant that 100% of polymer polyol passes through a 700-mesh screen in less than 600 seconds. A suitable method for determining filterability is described in the Examples.

Suitable base polyols (A) for the polymer polyols of the present invention include, for example, polyols such as, for example, polyether polyols, alkylene oxide adducts of non-reducing sugars and sugar derivatives, alkylene oxide adducts of polyhydroxyalkanes, alkylene oxide adducts of phosphorus and polyphosphorus acids, alkylene oxide adducts of polyphenols, polyols prepared from natural oils, etc.

The suitable polyols to be used as the base polyol include those having a functionality of at least 2, preferably at least 2.5, and more preferably at least 3. The functionality of suitable polyether polyols is less than or equal to 5, preferably less than or equal to 4.5, and most preferably less than or equal to 4. The suitable polyether polyols may also have functionalities ranging between any combination of these upper and lower values, inclusive, such as for example, at least 2 to 5, or at least 2.5 to 4.5, or at least 3 to 4. The suitable polyether polyols have hydroxyl numbers of 20 mg KOH/g polyol, preferably at least 25 mg KOH/g polyol, and most preferably at least 30 mg KOH/g polyol. Polyether polyols typically also have OH numbers of less than or equal to 150 mg KOH/g polyol, preferably less than or equal to 135 mg KOH/g polyol, and most preferably less than or equal to 120 mg KOH/g polyol. The suitable polyether polyols may also have OH numbers ranging between any combination of these upper and lower values, inclusive, such as, for example, of 20 to 150, or 25 to 135, or 30 to 120.

Examples of such compounds include polyoxyethylene glycols, triols, tetrols and higher functionality polyols, polyoxypropylene glycols, triols, tetrols and higher functionality polyols, polyoxyalkylene glycols, triols, tetrols and higher functionality polyols, mixtures thereof, etc. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable base polyols for the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4- 1,6- and 1,8-dihydroxyoctant, 1,10-dihydroxydecane, glycerol, 1,2, 4-tirhydroxybutane, 1,2,6-trihydroxyhexane, 1,1,1-trimethyl-olethane, 1,1,1-trimethylolpropane, pentaerythritol, caprolactane, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxy-phenol)ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable macromers and suitable preformed stabilizers to be used as component (B) for the polymer polyols are the novel macromers and the novel preformed stabilizers described herein above.

The (C) ethylenically unsaturated monomers suitable for the polymer polyols of the present invention and the process of preparing these include those ethylenically unsaturated monomers described above with respect to the preparation of the preformed stabilizer. Other suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N, N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the preformed stabilizer. Of the above monomers, the monovinylidene aromatic monomers, particularly styrene, and the ethylenically unsaturated nitriles, particularly acrylonitrile, are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred styrene and acrylonitrile are used in sufficient amounts such that the weight ratio of styrene to acrylonitrile (S:AN) may be from 80:20 to 20:80, or from 75:25 to 25:75. These ratios are suitable for polymer polyols and the processes of preparing them, regardless of whether they comprise the macromers or the preformed stabilizers of the present invention.

Overall, the quantity of ethylenically unsaturated monomer(s) present in the polymer polyols is at least 20% by weight, based on 100% by weight of the polymer polyol. It is preferred that the solids content is from 20 to 70% by weight, or from 30 to 60% by weight, and or from 40 to 55% by weight.

Suitable free-radical initiators include those as described previously for the preparation of the preformed stabilizers. Among the suitable initiators are those catalysts having a satisfactory half-life within the temperature ranges used in forming the polymer polyol, i.e. the half-life should be 25% or less of the residence time in the reactor at any given time. Preferred initiators for this portion of the invention include acyl peroxides such as didecanoyl peroxide and dilauroyl peroxide, alkyl peroxides such as di-tert-butyl peroxide and dicumyl peroxide, peroxyketals such as 1,1-di(t-butylperoxy)cyclohexane, 1,1-di(t-amylperoxy)cyclohexane, peroxyesters such as t-butyl peroxy-2-ethylhexanoate (TBPEH), t-butylperpivalate, t-amyl peroctoate, t-amylperoxypivalate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethylhexanoate, and azo catalysts such as azobis(isobutyronitrile), 2,2'-azo bis-(2-methylbutyronitrile), and mixtures thereof. Most preferred are the peroxyketals and peroxyesters described above, and azo catalysts.

The quantity of initiator used herein is not critical and can be varied within wide limits. In general, the amount of initiator ranges from 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents (E) suitable for the invention include, for example, one or more monol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred monol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

When used, the total amount of polymer control agent (PCA) present in the polymer polyols of the present invention may range from greater than about 3.0% to about 20% (or 3.5% to 15%, or 4.0% to 10%, or 5% to 7%) by weight, based on the total weight of the polymer polyol.

The quantity of polymer control agent when employed in the present invention is generally greater than about 3.0% by weight, or at least about 3.5%, or at least about 4.0% or at least about 5.0% by weight, based on the 100% by weight of all components which comprise the polymer polyol, prior to stripping the product, (i.e. components (A), (B), (C), (D), and (E)). The quantity of total polymer control agent, when employed, is generally less than or equal to 20% by weight, or less than or equal to about 15%, or less than or equal to 10% or less than or equal to about 7% by weight, based on the total weight of all components charged to the reactor. The total amount of polymer control agent, if used, will generally be any amount ranging between any combination of these lower and upper values.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of PFS A and PFS B in Table 1 of U.S. Pat. No. 7,179,882, the disclosure of which is herein incorporated by reference). The amount of crude polymer control agent in the total polymer control agent can range anywhere from 0% up to 100% by weight.

Polymer polyols comprising the preformed stabilizers of the present invention are prepared by utilizing the processes as disclosed in, for example, U.S. Pat. Nos. 4,148,840, 4,242,249, 4,954,561, 4,745,153, 5,494,957, 5,990,185, 6,455,603, 4,327,005, 4,334,049, 4,997,857, 5,196,476, 5,268,418, 5,854,386, 5,990,232, 6,013,731, 5,554,662, 5,594,066, 5,814,699 and 5,854,358, the disclosures of which are herein incorporated by reference. As described therein, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

In the process of preparing polymer polyols, the temperature range is not critical, and may vary from 100° C. to 140° C. or perhaps greater, or it may vary from 115° C. to 125° C. As has been noted herein, the initiator and temperature should be selected such that the initiator has a reasonable rate of decomposition with respect to the hold-up time in the reactor for a continuous flow reactor or the feed time for a semi-batch reactor.

The mixing conditions employed are those obtained using a back-mixer (e.g., a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The utilization of the processes as described in U.S. Pat. Nos. 5,196,476 and 5,268,418 are preferred in this aspect of the present invention since these allow for the preparation of polymer polyols with a wide range of monomer compositions, polymer contents and polymer polyols that could not be otherwise prepared with the necessary requisite stability. However, whether the utilization of the processes disclosed in U.S. Pat. Nos. 5,196,476 and 5,268,418 are essential depends on whether the process parameters are such that a satisfactory polymer polyol can be prepared without using either of these processes.

The polymer polyols of the present invention comprise dispersions in which the polymer particles (the same being either individual particles or agglomerates of individual particles) are relatively small in size and, in the preferred embodiment, are all essentially less than one to three microns. However, when high contents of styrene are used, the particles will tend to be larger; but the resulting polymer polyols are highly useful, particularly when the end use application requires as little scorch as possible. In a preferred embodiment, essentially all of the product (i.e., 99% by weight or more) will pass through the filter employed in the filtration hindrance (filterability) test that will be described in conjunction with the Examples. This insures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when 50% by weight of the product passes through the filter. Some applications may also find useful products in which only 20% by weight or even less passes through the filter.

In accordance with the present invention, the preformed stabilizer is present in an amount sufficient to insure that satisfactory stabilization will result in the desired filtration hindrance, centrifugible solids level and viscosity. In this regard, the quantity of preformed stabilizer generally ranges from 1 to 20% (or from 2 to 15%) by weight, based on the total feed. As one skilled in the art knows and understands, various factors including, for example, the free-radical initiator, the solids content, the weight ratio of S:AN, process conditions, etc., will affect the optimum quantity of preformed stabilizer.

Polyurethanes, preferably polyurethane foams, comprising the polymer polyols and processes for their production are also part of the present invention. Suitable polymer polyols for these polyurethanes include those prepared from preformed stabilizers which are based on the novel macromers described herein. These polyurethanes comprise the reaction product of a polyisocyanate component or prepolymer thereof, with an isocyanate-reactive component comprising the polymer polyols of the invention. The processes for preparing these polyurethanes comprise reacting a polyisocyanate component or prepolymer thereof, with an isocyanate-reactive component comprising the polymer polyols of the present invention.

The processes of preparing the flexible, semi-rigid, and/or rigid polyurethane foams comprises reacting (I) a diisocyanate and/or polyisocyanate component, with (II) an isocyanate-reactive component comprising the novel polymer polyols described herein, in the presence of (III) one or more catalysts, (IV) one or more blowing agents and, optionally, (V) one or more surfactants. In addition, crosslinking agents, chain extenders, other isocyanate-reactive components, etc., as described herein above, as well as various other additives and auxiliary agents may also be present.

Suitable diisocyanate and/or polyisocyanates for component (I) comprise those known in the art, to be suitable for the preparation of flexible polyurethane foams. The polyisocyanates may be di- or poly-functional, and include, for example, (cyclo)aliphatic di- and/or polyisocyanates, aromatic di- and/or polyisocyanates, and araliphatic di- and/or polyisocyanates. Some specific examples of suitable aromatic polyisocyanates and aromatic diisocyanates include compounds such as toluene diisocyanate, diphenylmethane diisocyanate, polymethylene polyphenyl polyisocyanate, etc., mixtures or blends of these di- and/or polyisocyanates with one another and/or with other di- and/or polyisocyanates, including (cyclo)aliphatic isocyanates and/or araliphatic isocyanates may also be used.

Suitable compounds to be used as component (II), the isocyanate-reactive component, herein for the preparation of flexible polyurethane foams include the novel polymer polyols described herein. In accordance with the present invention, the isocyanate-reactive component (II) may additionally comprise a conventional (i.e., non-solids containing) isocyanate-reactive component such as, for example, a polyoxyalkylene polyol, a polyether polyol, a polyester polyol, a polythioether, a polyacetal, a polycarbonate, a polycarbonate ether polyol, etc., and mixtures thereof. These isocyanate-reactive compounds having a functionality of from 2 to 8, or from 2 to 6, or from 2 to 4, and a number average molecular weight of from 1000 to 12,000, or from 1000 to 8,000, or from 2000 to 6000. In addition, lower molecular weight isocyanate-reactive components such as crosslinkers and/or chain extenders may be used. These lower molecular weight isocyanate-reactive components include chain extenders which may have functionalities of 2 and number average molecular weights ranging from 61 to 500; and crosslinking agents which may have functionalities of 3 to 4 and number average molecular weights ranging from 92 to less than 1000, or from 92 to less than or equal to 750, inclusive. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc. Some examples of suitable crosslinking agents include glycerol, trimethylolpropane, pentaerythritol, diethanolamine, triethanolamine, etc. It is also possible to use a polyether polyol that contains a high ethylene oxide content.

At least one polyurethane catalyst (III) is required to catalyze the reactions of the polymer polyols and water with the diisocyanate and/or polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of 0.05 to 3 parts by weight, more preferably from 0.1 to 2 parts, per 100 parts by weight of isocyanate-reactive mixture.

Suitable (IV) blowing agents for the present invention include, for example chemical blowing agents and/or physical blowing agents. Some examples of the suitable blowing agents for the present invention include water, formic acid, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal, etc. It is possible to use a mixture of blowing agent in the present invention. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein. In addition, water may be used as the sole blowing agent.

The amount of blowing agent or blowing agent mixture used is from 0.5 to 20%, preferably from 0.75 to 10% by weight, based in each case on 100% by weight of component (II). When water is the blowing agent, it is typically present in an amount of from 0.5 to 10% by weight, and preferably from 0.75 to 7% by weight, based on 100% by weight of component (II). The addition of water can be effected in combination with the use of the other blowing agents described.

Surfactants (V) may be used to prepare the foams. Surfactants are known to help stabilize the foam until it cures. Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of 0.1 to 4, preferably from 0.2 to 3, parts per 100 parts of isocyanate-reactive mixture.

Other optional components that may be present in the flexible foam formulations include, for example, flame retardants, antioxidants, pigments, dyes, liquid and solid fillers, etc. Such commercial additives are included in the foams in conventional amounts when used.

The flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with the present invention, the flexible foams are prepared at isocyanate indices ranges from 70 to 130, or from 80 to 120, or from 90 to 110. The term "isocyanate index", which may also be referred to as the NCO index, is defined herein as the ratio of reactive isocyanate groups (equivalents) to active hydrogen groups (equivalents), multiplied by 100%.

Although less preferred, a prepolymer approach to making the foams can also be used. In this approach, a significant portion of the isocyanate-reactive mixture is reacted with the diisocyanate and/or polyisocyanate, and the resulting prepolymer is then reacted with the remaining components.

Clause 1. A macromer comprising a polyether polyol having (meth)acrylate unsaturation and which comprises the polymerization product of: (a) a glycidyl (meth)acrylate, with (b) a polyether polyol having a hydroxyl number of 10 to 300, a functionality of 2 to 8, and an ethylene oxide content of 2 to 25% by weight, based on the total weight of the polyether polyol, and, optionally, (c) an alkylene oxide, in the presence of (d) a double metal cyanide catalyst.

Clause 2. The macromer of clause 1, wherein the amount of glycidyl (meth)acrylate present in the macromer is such that there are from 0.1 to 1.5 moles, or 0.2 to 1.3 moles of glycidyl (meth)acrylate, per mole of (b) polyether polyol present in the macromer.

Clause 3. The macromer of one of clause 1 to clause 2, wherein (a) the glycidyl (meth)acrylate comprises glycidyl methacrylate or glycidyl acrylate.

Clause 4. The macromer of one of clause 1 to clause 3, wherein (b) the polyether polyol has a hydroxyl number of at least 15 to 250, or at least 20 to 200.

Clause 5. The macromer of one of clause 1 to clause 4, wherein (b) the polyether polyol has a hydroxyl functionality of at least 2.5 to 7, or at least 3 to 6.

Clause 6. The macromer of one of clause 1 to clause 5, wherein the macromer comprises the polymerization product of (a) the glycidyl (meth)acrylate, with (b) the polyether polyol, and optionally, (c) an alkylene oxide, in the presence of (d) a double metal cyanide catalyst, at temperatures of 25 to 250° C., or of 60 to 200° C.; for a time period of 1 to 10 hours, or of 2 to 7 hours.

Clause 7. The macromer of one of clause 1 to clause 6, wherein (c) said alkylene oxide comprises ethylene oxide, propylene oxide, or a mixture thereof.

Clause 8. A process for preparing the macromer of one of clause 1 to clause 7, comprising polymerizing (a) a glycidyl (meth)acrylate), with (b) a polyether polyol having a hydroxyl number of 10 to 300, a functionality of 2 to 8, and an ethylene oxide content of 2 to 25% by weight, based on the total weight of the polyether polyol, and optionally, (c) an alkylene oxide, in the presence of (d) a double metal cyanide catalyst.

Clause 9. A preformed stabilizer comprising the free-radical polymerization product of the macromer of one of clause 1 to clause 7, with an ethylenically unsaturated monomer, in the presence of a free-radical polymerization initiator, and, optionally, a polymer control agent, and optionally, a liquid diluent.

Clause 10. The preformed stabilizer of clause 9, wherein the ethylenically unsaturated monomer comprises styrene, acrylonitrile or a mixture thereof.

Clause 11. The preformed stabilizer of one of clause 9 to clause 10, wherein the ethylenically unsaturated monomer comprises a mixture of styrene and acrylonitrile in a weight ratio of 80:20 to 20:80, or of 75:25 to 25:75.

Clause 12. The preformed stabilizer of one of clause 9 to clause 11, wherein the free-radical polymerization initiator comprises at least one of a peroxyketal, a peroxyester, and an azo compound.

Clause 13. The preformed stabilizer of one of clause 9 to clause 12, wherein the polymer control agent comprises isopropanol.

Clause 14. The preformed stabilizer of one of clause 9 to clause 13, wherein the liquid diluent comprises a polyol, a hydrocarbon, or a mixture thereof.

Clause 15. A process for the preparation of the preformed stabilizer of one of clause 9 to clause 14, comprising free-radically polymerizing the macromer of one of clause 1 to clause 7, with an ethylenically unsaturated monomer, in the presence of a free-radical polymerization initiator), and, optionally, a polymer control agent, and optionally, a liquid diluent.

Clause 16. A polymer polyol comprising the free-radical in-situ polymerization product of (A) a base polyol having a hydroxyl number of 20 to 150, and a functionality of 2 to 5, (B) the macromer of one of clause 1 to clause 7, or the preformed stabilizer of one of clause 9 to clause 14, with (C) an ethylenically unsaturated monomer, in the presence of (D) a free-radical polymerization initiator, and optionally, (E) a polymer control agent.

Clause 17. The polymer polyol of clause 16, wherein the polymer polyol has a solids content of 20 to 70% by weight, or of 30 to 60% by weight, or of 40 to 55% by weight.

Clause 18. The polymer polyol of one of clause 16 to clause 17, wherein (A) the base polyol comprises a polyether polyol having a hydroxyl number of 25 to 135, or of 30 to 120.

Clause 19. The polymer polyol of one of clause 16 to clause 18, wherein (A) the base polyol has a functionality of 2.5 to 4.5, or 3 to 4.

Clause 20. The polymer polyol of one of clause 16 to clause 19, wherein (C) the ethylenically unsaturated monomer comprises styrene, acrylonitrile or a mixture of styrene and acrylonitrile.

Clause 21. The polymer polyol of one of clause 16 to clause 20, wherein the ethylenically unsaturated monomer comprises a mixture of styrene and acrylonitrile in a weight ratio of 80:20 to 20:80, or of 75:25 to 25:75.

Clause 22. The polymer polyol of one of clause 16 to clause 21, wherein the free-radical polymerization initiator comprises at least one of a peroxyketal, a peroxyester, and an azo compound.

Clause 23. The polymer polyol of one of clause 16 to clause 22, wherein the free-radical polymerization initiator is present in an amount of from 0.01% to 2% by weight, based on 100% by weight of the polymer polyol.

Clause 24. The polymer polyol of one of clause 16 to clause 23, wherein (E) the polymer control agent comprises at least one of isopropanol, ethanol, tert-butanol, toluene, and ethylbenzene.

Clause 25. The polymer polyol of one of clause 16 to clause 24, wherein the polymer control agent is present in an amount of 3 to 20% by weight, or 3.5 to 15% by weight, or 4 to 10% by weight, or 5 to 7% by weight.

Clause 26. A process for the preparation of a polymer polyol of one of clause 16 to clause 25, comprising (I) free-radically polymerizing (A) a base polyol, (B) the macromer of one of clause 1 to clause 7, or the preformed stabilizer of one of clause 9 to clause 14, and (C) an ethylenically unsaturated monomer, in the presence of (D) a free-radical polymerization initiator, and optionally, (E) a polymer control agent.

Clause 27. A polyurethane foam comprising the reaction product of (I) a diisocyanate and/or polyisoyanate, with (II) an isocyanate-reactive component comprising the polymer polyol of one of clause 16 to clause 25.

Clause 28. The polyurethane foam of clause 27, wherein (I) and (II) are reacted in the presence of at least one of (III) a catalyst, (IV) a blowing agent, or (V) a surfactant.

Clause 29. The polyurethane foam of one of clause 27 to clause 28, wherein (II) the isocyanate-reactive component additionally comprises a polyether polyol having a functionality of 2 to 8, and a molecular weight of 1000 to 12,000.

Clause 30. The polyurethane foam of one of clause 27 to clause 29, wherein (II) the isocyanate-reactive component comprises a polyether polyol having a functionality of 2 to 6, or a functionality of 2 to 4; and a molecular weight of 1000 to 8000, or a molecular weight of 2000 to 6000.

Clause 31. The polyurethane foam of one of clause 27 to clause 30, wherein (III) the catalyst is present in an amount of 0.05 to 3%, or of 0.1 to 2% by weight, based on 100% by weight of (II) the isocyanate-reactive component.

Clause 32. The polyurethane foam of one of clause 27 to clause 31, wherein (IV) the blowing agent is present in an amount of 0.5 to 20% by weight, or 0.75 to 10% by weight, based on 100% by weight of (II) the isocyanate-reactive component.

Clause 33. The polyurethane foam of one of clause 27 to clause 32, wherein (IV) the blowing agent comprises at least one of water, formic acid, carbon dioxide, chlorofluorocarbons, highly fluorinated and/or perflourinated hydrocarbons, chlorinated hydrocarbons, and hydrocarbons.

Clause 34. A process for preparing the polyurethane foam of one of clause 27 to clause 33, comprising reacting (I) a diisocyanate and/or a polyisocyanate, with (II) an isocyanate-reactive component comprising the polymer polyol of one of clause 16 to clause 25, optionally in the presence of (III) a catalyst, (IV) a blowing agent, and (V) a surfactant.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the working examples.
Polyol A: A propylene oxide adduct of sorbitol containing a 16% ethylene oxide cap with a hydroxyl number of 28
Polyol B: A propylene oxide adduct of sorbitol containing an 8% ethylene oxide cap with a hydroxyl number of 28
Polyol C: A propylene oxide adduct of sorbitol with a hydroxyl number of 200
Polyol D: A propylene oxide adduct of glycerine containing a 20% ethylene oxide cap with a hydroxyl number of 36 and having a viscosity of 820 mPa·s
Polyol E: An 87/13 propylene oxide/ethylene oxide adduct of glycerine with a hydroxyl number of 52 and having a viscosity of 460 mPa·s
Isocyanate A: A monomeric MDI comprising about 42% by weight of the 4,4'-isomer of MDI, about 57% by weight of the 2,4'-isomer of MDI and the balance being the 2,2'-isomer of MDI
TMI: Isopropenyl dimethyl benzyl isocyanate (an unsaturated aliphatic isocyanate) sold as TMI® by Allnex
Catalyst 1: A DMC type catalyst sold commercially by Covestro LLC
Initiator 1: TBPEH (tertiary-butyl peroxy-2-ethylhexanoate), a free-radical polymerization initiator commercially available from United Initiators
Initiator 2: AIBN (2,2'-Azobisisobutyronitrile), a free-radical polymerization initiator commercially available as VAZO 64 from Chemours
Filtration: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g. 1⅛ in. diameter or 2.86 cm), such that all of the polymer polyol and isopropanol solutions passes by gravity through a 700-mesh screen. The 700-mesh screen is made with a Dutch twill weave. The actual screen used had a nominal opening of 30 microns. The amount of sample which passed through the screen within 600 seconds was reported in percent, and a value of 100 percent indicates that over 99 weight percent passed through the screen.

TEST METHODS

OH Number (Hydroxyl Number)

The OH number was determined according to ASTM D4274-11, reported in mg [KOH]/g [polyol].

Viscosity

Viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity.

Gel Permeation Chromatography

The number average and weight average, Mn and Mw, respectively, molecular weights were determined by gel-permeation chromatography (GPC) using a method based on DIN 55672-1, employing chloroform as the eluent with a mixed bed column (Agilent PL Gel; SDVB; 3 micron Pore diameter: 1× Mixed-E+5 micron Pore diameter: 2× Mixed-D), refractive index (RI) detection and calibrated with polyethylene glycol as the standard.

Solids Content and S:AN Ratio

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene: acrylonitrile in the total polymer. One skilled in the art will recognize that this is an analytical confirmation of the main mechanism for controlling the S/AN ratio, which is the wt. % of monomers in the total reactor feed.

Macromer 1: Polyol A (99.14%), TMI (0.45%), Isocyanate A (0.40%), and 0.01% of bismuth(III)neodecanoate catalyst were heated at 75° C. for 4 hours.

Macromer 2: Polyol B (2800 g), 2.3g of phenothiazine, and 0.46 g Catalyst 1 were placed in a 2 gallon stainless steel reactor equipped with agitator, and heating/cooling capabilities. A vacuum was applied, and the mixture vacuum stripped at 130° C. for 40 minutes. Propylene oxide (88 g) was fed to the reactor at 130° C. to activate Catalyst 1 (as determined by PO pressure drop in the reactor). The reactor temperature was lowered to 100° C. and glycidyl methacrylate (32 g) was fed. The reactor contents were heated at 100° C. for 30 minutes, then an additional 40 g of PO were added. The oxide feed was stopped and the reactor contents held at 100° C. for 60 minutes before being vacuum stripped for 30 minutes. The reactor contents were cooled, and 2.3 g of 4-methoxyphenol added to give a clear product with an hydroxyl number of 26.4.

Macromer 3: Polyol B (97.98%), TMI (2%), and 0.02% of bismuth(III) neodecanoate catalyst were heated at 75° C. for 2 hours.

Macromer 4: Polyol C (615 g), 2.3 g of phenothiazine, and 0.46 g Catalyst 1 were placed in a 2 gallon stainless steel reactor equipped with agitator, and heating/cooling capabilities. A vacuum was applied, and the mixture vacuum stripped at 130° C. for 40 minutes. Propylene oxide (105 g) was fed to the reactor at 130° C. to activate Catalyst 1 (as determined by PO pressure drop in the reactor). The reactor temperature was lowered to 110° C. and PO (1220 g) was added over 75 minutes. Then 2649 g of a PO mixture containing 1.85% glycidyl methacrylate were fed over 159 minutes. The oxide feed was stopped and the reactor contents held at 110° C. for 60 minutes before being vacuum stripped for 30 minutes. The reactor contents were cooled, and 2.3 g of 4-methoxyphenol added to give a clear product with an hydroxyl number of 30.7.

Preformed Stabilizer (PFS) Preparation

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 1.

Preformed stabilizers 1-4 in Table 2 were prepared from Macromers 1-4, respectively, using the following formulation:

TABLE 1

| Preformed Stabilizer Composition | |
| --- | --- |
| Component | PFS |
| PCA Type | Isopropanol |
| PCA, wt. % | 60.0% |
| Macromer | Macromer |
| Macromer, wt. % | 24.0% |
| Monomer, wt. % | 15.9% |
| Styrene/acrylonitrile ratio | 50:50 |
| Initiator 1, wt. % | 0.1% |

TABLE 2

| Preformed Stabilizers 1-4 | |
| --- | --- |
| Preformed Stabilizer | Macromer |
| 1 | 1 |
| 2 | 2 |
| 3 | 3 |
| 4 | 4 |

Polymer Polyol Preparation

This series of examples (Table 3) relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping.

TABLE 3

Formulations for Polymer Polyols

| Component | PMPO 1* | PMPO 2 | PMPO 3* | PMPO 4 |
|---|---|---|---|---|
| Base Polyol | D | D | E | E |
| Base Polyol (wt. % in feed) | 51.8 | 51.8 | 45.7 | 45.5 |
| PFS | 1 | 2 | 3 | 4 |
| PFS (wt. % in feed) | 7.4 | 7.4 | 5.5 | 6.6 |
| Styrene (wt. % in feed) | 25.7 | 25.7 | 31.3 | 31.0 |
| Acrylonitrile (wt. % in Feed) | 14.8 | 14.8 | 16.8 | 16.6 |
| Initiator 2 (wt. % in feed) | 0.29 | 0.29 | 0.25 | 0.25 |
| PCA (wt. % in feed) | 4.4 | 4.4 | 3.6 | 5.0 |
| Total Polymer (wt. %) | 43 | 43 | 50 | 50 |
| Viscosity mPa.s @ 25° C. | 5111 | 4966 | 5312 | 5309 |
| Filterability-700 mesh (seconds) | 324 | 349 | 251 | 224 |
| particle size (microns) | 1.0 | 1.0 | 1.2 | 1.2 |

*comparative examples

As illustrated by the working example, the inventive process results in polymer polyol products that are as good as the comparative examples with respect to filterability, particle size, etc. at a specific polymer content, while giving lower viscosities.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer polyol comprising the reaction product of:
   (A) a base polyol having a functionality of 2 to 5 and a hydroxyl number of 20 to 150,
   (B) a preformed stabilizer comprising the free-radical polymerization product of (1) a macromer, with (2) an ethylenically unsaturated monomer, in the presence of (3) a free-radical polymerization initiator, and, optionally, (4) a polymer control agent, and, optionally, (5) a liquid diluent,
   and
   (C) an ethylenically unsaturated monomer,
   in the presence of
   (D) a free-radical polymerization initiator,
   and, optionally
   (E) a polymer control agent,
   wherein the macromer comprises a polyether polyol having (meth)acrylate unsaturation and which comprises the polymerization product of a reaction mixture comprising: (a) a glycidyl (meth)acrylate, (b) a polyether polyol having a hydroxyl number of 10 to 300, a functionality of 2 to 8, and an ethylene oxide content of 2 to 25% by weight, based on the weight of the polyether polyol, and (c) a double metal cyanide catalyst.

2. A polymer polyol comprising the reaction product of:
   (A) a base polyol having a functionality of 2 to 5 and a hydroxyl number of 20 to 150,
   (B) a macromer comprising a polyether polyol having (meth)acrylate unsaturation and which comprises the polymerization product of a reaction mixture comprising: (a) a glycidyl (meth)acrylate, (b) a polyether polyol having a hydroxyl number of 10 to 300, a functionality of 2 to 8, and an ethylene oxide content of 2 to 25% by weight, based on the weight of the polyether polyol, and (c) a double metal cyanide catalyst,
   and
   (C) an ethylenically unsaturated monomer,
   in the presence of
   (D) a free-radical polymerization initiator,
   and, optionally
   (E) a polymer control agent.

3. A process for preparing the polymer polyol of claim 1, comprising free-radically polymerizing
   (A) the base polyol having a functionality of 2 to 5 and a hydroxyl number of 20 to 150,
   (B) the preformed stabilizer,
   and
   (C) the ethylenically unsaturated monomer,
   in the presence of
   (D) the free-radical polymerization initiator,
   and, optionally
   (E) the polymer control agent.

4. A process for preparing the polymer polyol of claim 2, comprising free-radically polymerizing
   (A) the base polyol having a functionality of 2 to 5 and a hydroxyl number of 20 to 150,
   (B) the macromer,
   and
   (C) the ethylenically unsaturated monomer,
   in the presence of
   (D) the free-radical polymerization initiator,
   and, optionally
   (E) the polymer control agent.

5. The process of preparing a polyurethane foam, comprising reacting (I) the polymer polyol of claim 1, with (II) a di- and/or polyisocyanate component.

6. The process of preparing a polyurethane foam, comprising reacting (I) the polymer polyol of claim 2, with (II) a di- and/or a polyisocyanate component.

7. The polymer polyol of claim 1, wherein the amount of glycidyl (meth)acrylate present in the macromer is such that there are from 0.1 to 1.5 moles of glycidyl (meth)acrylate per mole of (b) polyether polyol present in the macromer.

8. The polymer polyol of claim 2, wherein the amount of glycidyl (meth)acrylate present in the macromer is such that there are from 0.1 to 1.5 moles of glycidyl (meth)acrylate per mole of (b) polyether polyol present in the macromer.

9. The polymer polyol of claim 1, wherein (b) the polyether polyol has a hydroxyl number of 15 to 250 and a functionality of 2.5 to 7.

10. The polymer polyol of claim 2, wherein (b) the polyether polyol has a hydroxyl number of 15 to 250 and a functionality of 2.5 to 7.

11. The polymer polyol of claim 1, wherein the reaction mixture further comprises (d) an alkylene oxide.

12. The polymer polyol of claim 2, wherein the reaction mixture further comprises (d) an alkylene oxide.

13. The polymer polyol of claim 11, wherein (c) the alkylene oxide comprises ethylene oxide, propylene oxide, or a mixture thereof.

14. The polymer polyol of claim 12, wherein (c) the alkylene oxide comprises ethylene oxide, propylene oxide, or a mixture thereof.

\* \* \* \* \*